Patented June 4, 1940

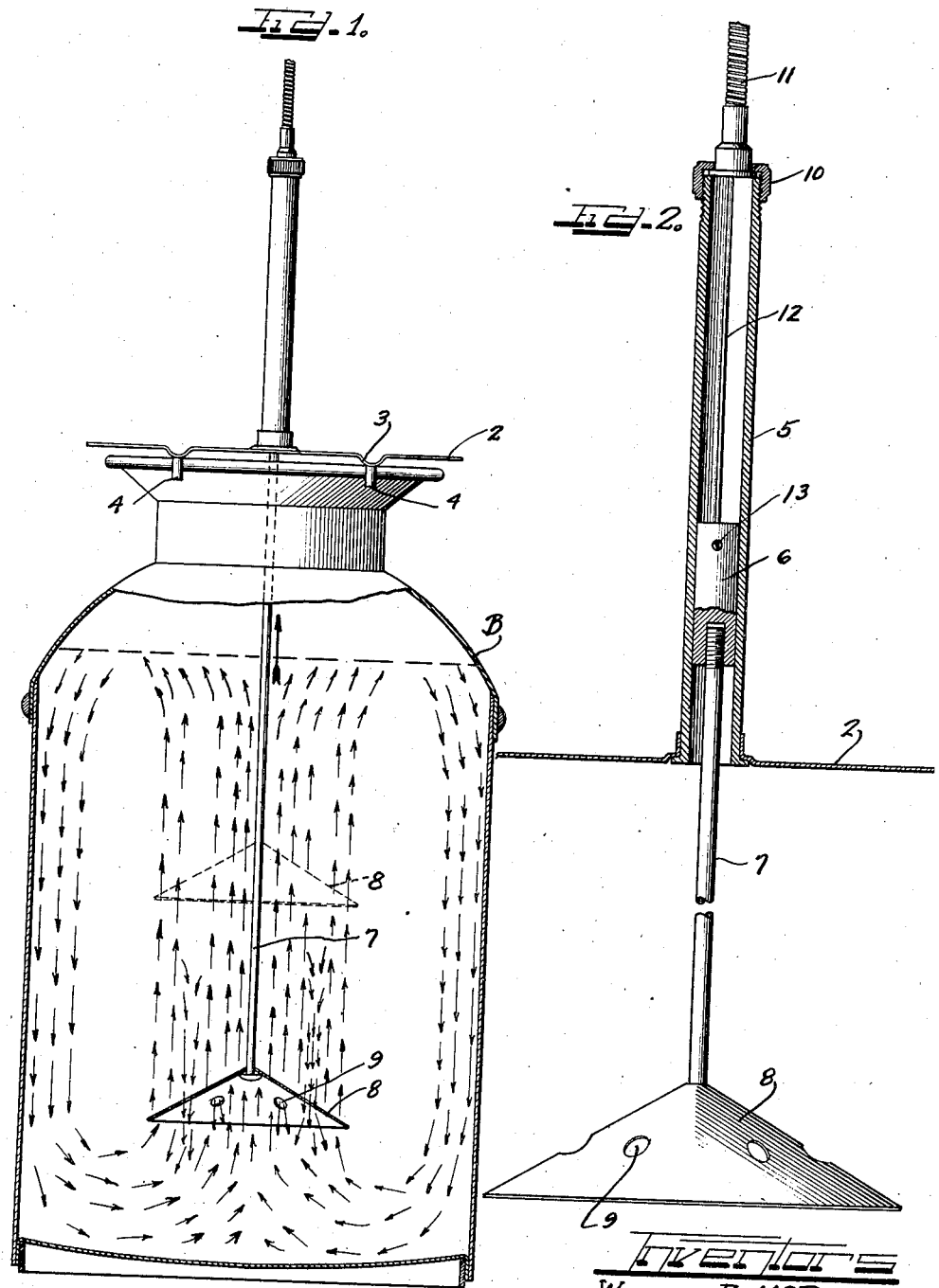

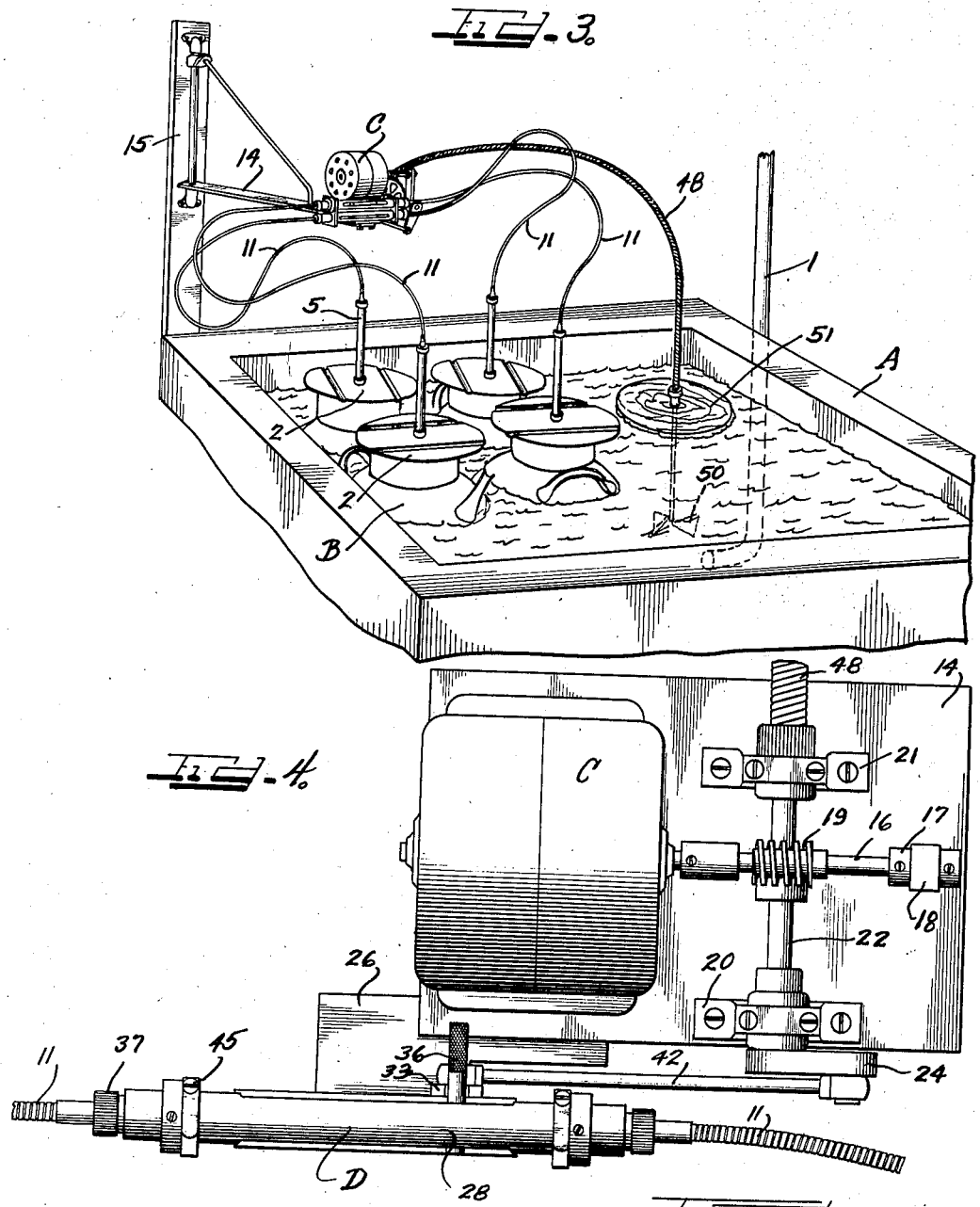

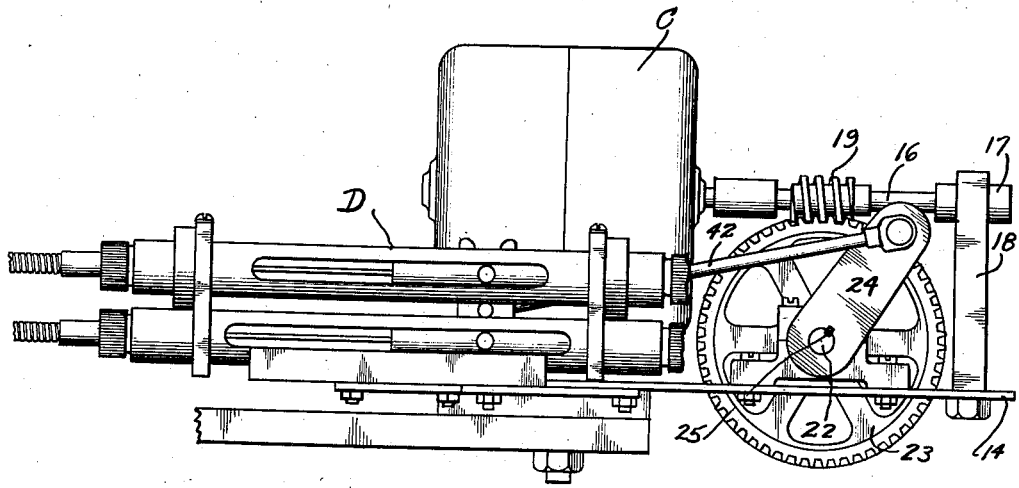
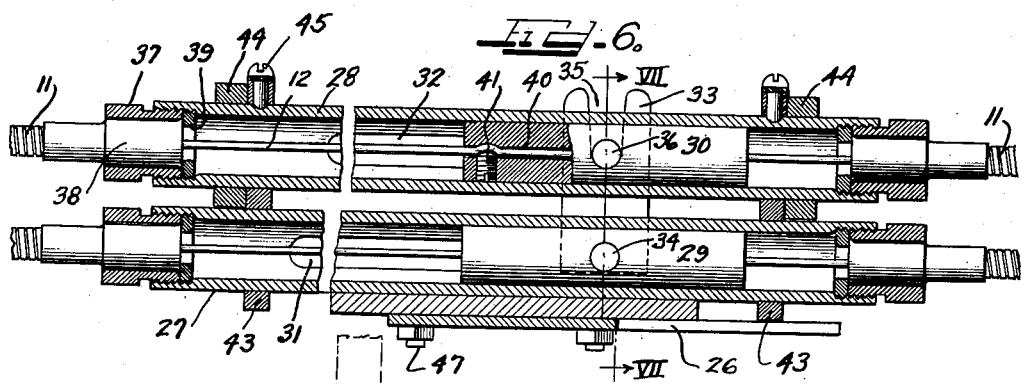
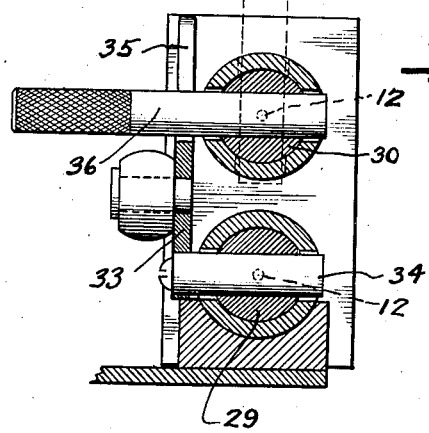

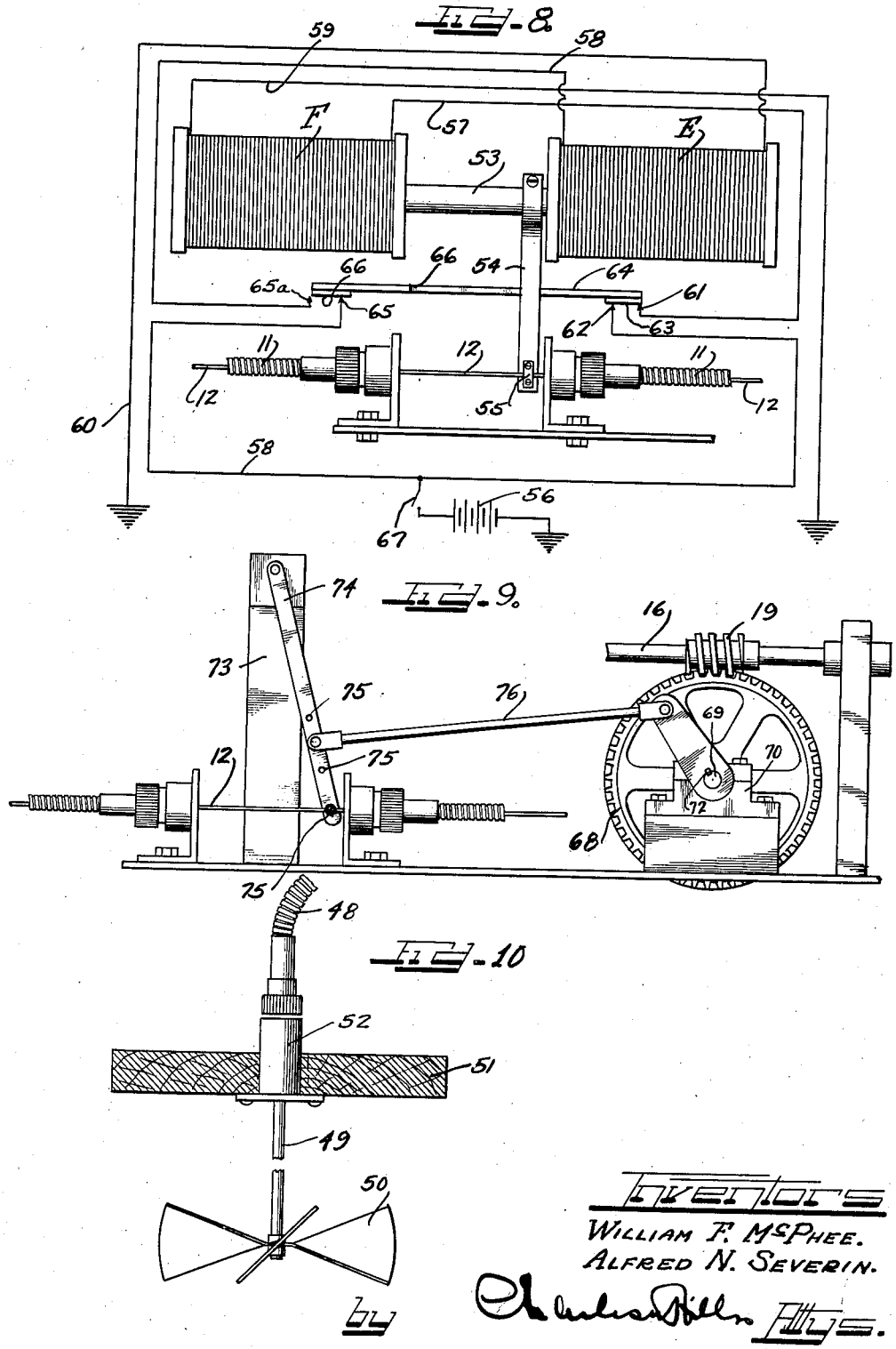

2,202,860

UNITED STATES PATENT OFFICE 2,202,860

STIRRER

William F. McPhee, Joliet, and Alfred N. Severin, Chicago, Ill.

Application September 8, 1938, Serial No. 228,910

2 Claims. (Cl. 74—501)

The present invention relates to a stirrer and more particularly to an apparatus for stirring milk on the farm, the milk being in cans immersed in a cooling bath.

An object of the present invention is to provide a stirring apparatus wherein a plurality of milk cans may be subjected to stirring action with the stirrers in the several cans driven simultaneously from a common source of power, at a remote point.

Another object of the present invention relates to a stirring apparatus for use in cooling milk wherein means are provided for agitating the milk in a plurality of cans while immersed in a cooling bath, together with means for agitating the bath, and a common source of power connected to all of the stirrers or agitating means to operate them simultaneously.

A further object of the present invention is to provide a novel crosshead arrangement for imparting vertical movement to a plurality of stirrers installed in milk cans at points remote from the crosshead, together with means for actuating the crosshead.

A still further object of the present invention is to provide a stirring element applicable to a milk can for stirring the contents of the same, which stirring element comprises a funnel-shaped dasher arranged to be moved vertically in a milk can by wire operated from a distance, which wire is reciprocated by means of a crosshead driven by a suitable source of power, such for example, as an electric motor.

The invention has for a further object the provision of an apparatus for stirring the contents of a plurality of milk cans while the latter are immersed in a cooling bath, which apparatus comprises vertically reciprocable stirring means insertable in the cans and which are driven by flexible wires from a remote point and by a single power source, the flexible driving means enabling ready application of the stirrers to the milk cans, and also the ready removal of the stirrers from the cans, one by one, without having to shift the source of motive power.

The above, other and further objects of the present invention will be apparent from the following description and accompanying drawings.

The accompanying drawings illustrate embodiments of the present invention and the views thereof are as follows:

Figure 1 is a view, partially in side elevation and partially in vertical section, of a milk can having applied thereto the stirrer of the present invention, and showing in dotted lines, the cooling action occurring within a filled can of milk when the stirrer is operated.

Figured 2 is an enlarged vertical axial sectional view, with parts in elevation, of the stirrer and the manner of mounting it on a cover for reciprocation.

Figure 3 is a fragmental view of a tank showing a plurality of milk cans immersed in the tank, which cans are equipped with the stirrers of the present invention and in which there is a floating stirrer for agitating the cooling liquid surrounding the cans.

Figure 4 is a top plan view of a motor and its driving connections to the crosshead of the present invention.

Figure 5 is an elevational view of the motor and crosshead.

Figure 6 is a central axial sectional view through the crosshead structure of the present invention showing one manner of attaching the wires to the crosshead.

Figure 7 is a transverse sectional view through the crosshead taken in the plane of line VII—VII Figure 6.

Figure 8 is a schematic arrangement of solenoid drive for operating the stirrers.

Figure 9 is a fragmental view of another form of driving arrangement between a motor shaft and the wires.

Figure 10 is a fragmental sectional view of a float supported agitator or stirrer which may float in the cooling liquid or might be applied to a can for agitating its contents.

The drawings will now be explained.

Referring to Figure 3, a tank A, of suitable size and capacity, is arranged to be supplied with water through an inlet 1. The capacity of the tank is such as to take several milk cans for cooling the same.

The present apparatus is adapted to be used on a dairy farm, by the farmer, for cooling the milk as soon as it can be put in the milk cans after milking, for checking the growth of bacteria.

In the illustration embodied in Figure 3 there are four cans B containing milk.

Referring to Figure 1, a can B has removably applied to it, on its open end, a cover 2 formed with rib 3 to space the plane of the cover slightly above the open end of the can to allow escape of air from the interior of the can during the stirring operation. The cover 2 is held in position on the open end of the can by means of lugs 4 depending from the cover and engaging about the periphery of the open end.

Attached to the cover 2 is a cylinder 5 in which a piston 6 is reciprocable. The lower end of the piston is counterbored and threaded to receive the threaded end of a stirrer shaft 7, which shaft at its lower end carries a funnel-shaped agitator or stirrer 8, provided with openings 9 through which milk may pass as the stirrer is reciprocated in the milk within the can.

Attached to the upper end of the cylinder 5, by means of a locking nut 10, is a flexible casing 11 through which a wire 12 passes. The wire enters the cylinder 5 and is secured at one end to the piston 6, the piston being suitably counterbored and provided with a set screw 13 for attaching the wire to the piston within the cylinder.

The flexible casing 11 and the contained wire, may be as long as desirable and lead to a crosshead which will be later explained.

As illustrated in Figure 3, there are four cans B all equipped with the covers 2 carrying the stirring means of the type illustrated in Figures 1 and 2.

An arm 14 is supported on an upright 15 constituting a part of the tank A, or which may be a post or wall adjacent the tank, and which arm is adapted to swing in a horizontal plane.

Carried at the outer end of the arm is a motor C having a shaft 16 extending from one end with its outer end supported in a bearing 17 secured in a post 18 rising from the arm 14. A worm 19 is suitably fastened to the shaft 16 to rotate with it.

Supported in suitable bearings 20 and 21 on the end of the arm 14 is a cross shaft 22 provided with a worm gear 23 in mesh with worm 19.

A crank 24 is secured to the shaft 22 by a key 25 or equivalent means.

Supported by means of a shelf 26, which may be an integral part of the arm 14, or a separate part suitably attached, is a crosshead arrangement designated generally at D.

As illustrated, the crosshead arrangement includes two horizontally disposed cylinders 27 and 28 arranged one above the other in which pistons 29 and 30, respectively, are reciprocable.

The cylinders 27 and 28 are slotted laterally, as at 31 and 32 respectively. A plate 33 arranged alongside the cylinders is secured to the lower piston 29 by means of a pin 34 projecting through the slot 31 in the cylinder 27. The upper portion of the plate 33 is notched at 35 to receive a pin 36 extending through the piston 30 and through the slot 32 in the cylinder 28. Normally the pin 36 is parallel to the pin 34, as may be observed in the drawings.

The ends of the cylinders 27 and 28 are closed by hollow plugs 37 which receive the ends of nipples 38 secured to the flexible casings 11. The inner ends of the nipples 38 abut lock washers 39 threaded into the interiors of the ends of the cylinders.

The wires 11 enter the cylinders 27 and 28 through the nipples 38 and extend through bored portions 40 of the pistons 29 and 30 and extend therefrom through other casings 11 to other stirrers. Set screws 41 are utilized for securing the wires 11 in the pistons 29 and 30 against relative endwise movement.

A pitman 42 connects the crank 24 to the plate 33 to reciprocate it as the motor is in operation, such reciprocation reciprocating the pistons 29 and 30 thus imparting endwise movement to the wires 11 which in turn causes vertical movement of the stirrers 8 in the milk cans.

The cylinders 27 and 28 are held in operative relationship by means of suitable blocks 43 apertured to surround the cylinders, while the upper cylinder 28 is provided with collars 44 resting against the outer surfaces of the blocks 43 to hold the cylinder against endwise displacement while permitting rotative movement thereof, as a whole, by means of the pin 36, from the full line position of Figure 7 to the dotted line position.

Set screws 45 entered in the upper ends of the blocks 43 hold the cylinders in place. The crosshead as a whole is secured to the shelf 26 by means of suitable bolts 47 or similar attaching means.

To the end of the shaft 22 opposite the crank 24 a flexible casing 48 is secured, in which casing is a wire operatively connected to a shaft 49 (see Figure 10), to the lower end of which is attached a paddle wheel 50, which may have two, three or four blades as desired. The shaft 49 is secured in a float 51, such as a piece of cork, by means of a nipple 52 or similar securing device.

The float 51 may be put in the bath to support the paddle wheel 50 for agitating the water as the motor is operated.

The several stirrers, being operatively connected with a common source of power, such as a motor C, are very easy to apply to cans of milk in the tank and very easy to remove. The flexible casings 11 enclosing the operating wires, may be readily flexed, making the task of application and removal a simple one.

The operation of the described form of the invention is as follows:

After the several cans of milk B, filled with milk, have been placed in the tank A, the covers 2 are applied with the stirrers 8 immersed in the milk. The float 51 is applied to the bath and the motor C put in operation. The operation of the motor causes reciprocation of the crosshead thus imparting vertical movement to the stirrers 8 in the several cans and at the same time operates the paddle 50 to agitate the water in the tank.

The result of such operation is to quickly cool the milk and prevent the formation of bacteria. When sufficient agitation or stirring operation has been completed, the motor is stopped and the several covers 2 removed from the cans, the regular covers applied and the cans removed from the tank.

While in the present instance, four milk cans have been shown in a tank, it is of course to be understood that a greater number or a fewer number may be utilized, depending on the number of stirrers operatively associated with the motor.

It is within the purview of the present invention to utilize more than the two cylinders 27 and 28, in which event a greater number of the stirrers could be used and operated by the single source of power, such as the motor C.

Figure 8 illustrates a different form of drive for the reciprocable movement of the wires.

In this form of the invention, solenoids E and F are provided with a common core 53 to which is attached an arm 54 fastened at 55 to a wire 12.

A source of electrical power, such for example, as a battery 56 is connected to one end of the coil of the solenoid F by conductor 57 and is also connected to one end of the coil of the solenoid E by conductor 58. One end of the coil of the solenoid F is provided with a ground 59, while the coil of the solenoid E is grounded by a conductor 60.

For energizing the solenoid F, to pull the core 53 to the left as viewed in Figure 8, contact points 61 and 62 in series in the conductor 57 are adapted to be bridged by a conductor piece 63 when a shiftable bar 64 is moved to the right by the arm 54 as the core 53 is moved to the right by the solenoid E. Shifting of the bar 64 opens the circuit between the points 65 and 65ᵃ in the conductor 58 to the solenoid E. A contact piece 66 is carried by the adjacent end of the bar 64 to close the electrical circuit between the contacts 64 and 65 when the bar 64 is shifted to the left, which occurs when the arm 54 engages the notch 66 in the bar as the core 53 reaches its limit of movement to the left, shifting of the bar in the manner described opens circuit between the contacts 61 and 62.

Thus it will be observed that as long as the switch 67 between the source of energy 56 and the conductors 57 and 58 is closed, the structure will function to reciprocate the wire 12. As soon as the switch 67 is opened the circuit to the solenoids is broken and the apparatus comes to rest.

In the form of the invention illustrated in Figure 9 the worm 19 on the motor shaft 16 meshes with a worm gear 68 carried by a shaft 69 supported in bearing 70. A crank 71 is secured as by a key to the shaft 69 to swing with the shaft.

A post 73 pivotally supports one end of an arm 74, the lower end of which is connected by a screw 75 to a wire 12. A pitman 76 connects the crank 71 to the swinging arm 74 to reciprocate the wire 12. The arm 74 may be provided with a plurality of apertures 75 so that the stroke of the arm may be varied as conditions warrant.

While Figures 8 and 9 illustrate operation of but a single wire 12, for working two stirrers, it is to be understood that the principle may be applied to operate more than two, in the manner described with reference to the form of the invention illustrated in Figures 1 to 7 inclusive.

It will be observed that the apparatus of the present invention is simple in construction, efficient in use, and makes it very easy for the attendant to apply the stirrers to the several milk cans or to remove the stirrers from the cans, all of the stirrers being operated from a single source, remotely disposed, with respect to the cans. The provision of agitating means for the cooling bath is beneficial, as agitation of the cooling liquid tends to expedite the cooling of the milk within the several cans, thus reducing the length of time that the stirrers must be operated in the cans.

The parts are so constructed that all of those which enter the milk in the cans may be readily removed for sterilization, thus affording at all times a sanitary stirrer which cannot contaminate the milk in the cans.

The piston 30 in cylinder 28 may be disconnected from the crosshead 33, by swinging the pin 36 out of the notch 35 in the bead 33, as shown by dotted lines in Figure 7. In this manner but two stirrers would be operated, that is, those connected for actuation to the piston 29 in cylinder 27.

The invention has been described herein more or less precisely as to details, yet it is to be understood as not limited thereby, as changes may be made in the arrangement and proportion of parts, and equivalents may be substituted, without departing from the spirit and scope of the invention.

The invention is claimed as follows:

1. A device for reciprocating a plurality of separated reciprocable parts remotely disposed, comprising cylinders having elongated slots therein, pistons within the cylinders, pins through said slots and connected to said pistons, means connected to said pins for causing simultaneous movement of said pistons, driving means connected to said last mentioned means, driving wires connected to said pistons and projecting through both ends of the cylinders for operative connection to said remotely disposed separated reciprocable parts with one wire to a part, and means encasing said wires to limit movement of said wires in accordance with reciprocations of said pistons to push pull movement.

2. A device for reciprocating a plurality of separated reciprocable parts remotely disposed, comprising a plurality of open ended cylinders arranged in parallel and side by side relation, pistons within said cylinders, driving wires connected to said pistons and projecting through both ends of the cylinders for operative connection to said remotely disposed separated reciprocable parts with one wire to a part, individual encasing means for said wires to limit movement of said wires responsive to the reciprocation of said pistons to push pull movement, mechanical drive means operatively connected to said pistons to cause simultaneous movement of the same, said drive means being capable of disconnection from at least one of said pistons to allow said piston and its connected parts to remain idle while at least one of other pistons is reciprocated.

WILLIAM F. McPHEE.
ALFRED N. SEVERIN.